(12) United States Patent  
Sumi

(10) Patent No.: US 10,623,714 B2  
(45) Date of Patent: Apr. 14, 2020

(54) STEREOSCOPIC DISPLAY DEVICE AND METHOD FOR OPERATING USING PIXEL OFFSET MAP

(71) Applicant: InnoLux Corporation, Miao-Li County (TW)

(72) Inventor: Naoki Sumi, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 16/174,149

(22) Filed: Oct. 29, 2018

(65) Prior Publication Data

US 2019/0364258 A1 Nov. 28, 2019

Related U.S. Application Data

(60) Provisional application No. 62/675,774, filed on May 24, 2018.

(51) Int. Cl.
*H04N 13/125* (2018.01)
*H04N 13/383* (2018.01)
*H04N 13/398* (2018.01)
*H04N 13/305* (2018.01)

(52) U.S. Cl.
CPC ......... *H04N 13/125* (2018.05); *H04N 13/305* (2018.05); *H04N 13/383* (2018.05); *H04N 13/398* (2018.05)

(58) Field of Classification Search
CPC .. H04N 13/125; H04N 13/305; H04N 13/383; H04N 13/398
USPC .......................................................... 348/78
See application file for complete search history.

(56) References Cited

U.S. PATENT DOCUMENTS

| 6,327,381 | B1* | 12/2001 | Rogina | G06T 15/10 382/154 |
| 2006/0038879 | A1* | 2/2006 | Kremen | H04N 19/00 348/51 |
| 2008/0007511 | A1* | 1/2008 | Tsuboi | G02B 27/2214 345/102 |
| 2010/0091206 | A1* | 4/2010 | Chapman | G02B 27/2214 349/15 |
| 2012/0169724 | A1* | 7/2012 | Park | G02B 27/2214 |
| 2013/0135299 | A1 | 5/2013 | Park | |

(Continued)

OTHER PUBLICATIONS

Xue et al., Multi-User Autostereoscopic 2D/3D Switchable Flat-Panel Display, Sep. 2014, Journal of Display Technology, vol. 10, No. 9, pp. 737-745 (Year: 2014).*

*Primary Examiner* — Marnie A Matt
(74) *Attorney, Agent, or Firm* — Winston Hsu

(57) ABSTRACT

A stereoscopic display device is capable of adjusting visual effects. The display device has a display module, an optical modulator, a storage element, and a controller. The display module has a plurality of pixels. The optical modulator is disposed on the display module and modulates light emitted from the display module to corresponding directions. The optical modulator has a plurality of lenses each having a reference line. The storage element stores a pixel offset map containing pixel offsets between the center of each pixel of the plurality of pixels to a closest reference line of the plurality of lenses. The controller is coupled to the display module and the storage element, and used to adjust data of the each pixel according to the pixel offset map.

15 Claims, 11 Drawing Sheets

(56) References Cited

U.S. PATENT DOCUMENTS

| | | | |
|---|---|---|---|
| 2013/0163078 A1* | 6/2013 | Saito | H04N 13/305 359/466 |
| 2014/0285643 A1* | 9/2014 | Usukura | G02B 27/2214 348/59 |
| 2015/0341616 A1* | 11/2015 | Siegel | H04N 13/111 348/54 |
| 2019/0222828 A1* | 7/2019 | Salvador | H04N 13/305 359/466 |

* cited by examiner

| Y\X | 0 | 1 | 2 | 3 | 4 | 5 | 6 | 7 | 8 |
|---|---|---|---|---|---|---|---|---|---|
| 0 | -0.163 | 0.012 | 0.188 | 0.363 | -0.461 | -0.286 | -0.110 | 0.065 | 0.241 |
| 1 | -0.230 | -0.055 | 0.121 | 0.296 | 0.471 | -0.353 | -0.178 | -0.002 | 0.173 |
| 2 | -0.298 | -0.122 | 0.053 | 0.229 | 0.404 | -0.420 | -0.245 | -0.070 | 0.106 |
| 3 | -0.365 | -0.190 | -0.014 | 0.161 | 0.337 | -0.488 | -0.312 | -0.137 | 0.038 |
| 4 | -0.432 | -0.257 | -0.082 | 0.094 | 0.269 | 0.445 | -0.380 | -0.204 | -0.029 |
| 5 | -0.500 | -0.324 | -0.149 | 0.027 | 0.202 | 0.377 | -0.447 | -0.272 | -0.096 |
| 6 | 0.433 | -0.392 | -0.216 | -0.041 | 0.135 | 0.310 | 0.486 | -0.339 | -0.164 |
| 7 | 0.366 | -0.459 | -0.284 | -0.108 | 0.067 | 0.243 | 0.418 | -0.406 | -0.231 |
| 8 | 0.298 | 0.474 | -0.351 | -0.175 | 0.000 | 0.175 | 0.351 | -0.474 | -0.298 |
| 9 | 0.231 | 0.406 | -0.418 | -0.243 | -0.067 | 0.108 | 0.284 | 0.459 | -0.366 |
| 10 | 0.164 | 0.339 | -0.486 | -0.310 | -0.135 | 0.041 | 0.216 | 0.392 | -0.433 |
| 11 | 0.096 | 0.272 | 0.447 | -0.377 | -0.202 | -0.027 | 0.149 | 0.324 | 0.500 |
| 12 | 0.029 | 0.204 | 0.380 | -0.445 | -0.269 | -0.094 | 0.081 | 0.257 | 0.432 |
| 13 | -0.038 | 0.137 | 0.312 | 0.488 | -0.337 | -0.161 | 0.014 | 0.190 | 0.365 |
| 14 | -0.106 | 0.070 | 0.245 | 0.420 | -0.404 | -0.229 | -0.053 | 0.122 | 0.298 |
| 15 | -0.173 | 0.002 | 0.178 | 0.353 | -0.471 | -0.296 | -0.121 | 0.055 | 0.230 |
| 16 | -0.241 | -0.065 | 0.110 | 0.286 | 0.461 | -0.363 | -0.188 | -0.012 | 0.163 |

FIG. 3

STEREOSCOPIC DISPLAY DEVICE AND METHOD FOR OPERATING USING PIXEL OFFSET MAP

CROSS REFERENCE TO RELATED APPLICATION

This non-provisional application claims priority of U.S. provisional application No. 62/675,774, filed on May 24, 2018, included herein by reference in its entirety.

BACKGROUND OF THE DISCLOSURE

1. Field of the Disclosure

The present disclosure is related to a display device, and more particularly, to a display device capable of presenting an auto-stereoscopic visual effect.

2. Description of the Prior Art

To present natural three dimensional (3D) images on the display devices without using glass, light field displays and super multi-view displays have been developed. For example, when displaying an object by a light field display, the light field display can use lenticular lenses to direct images of different views of the object to different directions so viewers at different positions can watch different views of the object. In this case, by providing images of appropriate viewing angles to the right eye and the left eye of the viewer, the viewer would be able to sense the 3D visual effect.

In prior art, the fabrication and lamination process of the lenticular lenses may have a critical non-uniformity problem, which leads to increased cost of the display device and a phenomenon of crosstalk between pixels of the display device. However, the conventional 3D display algorithm doesn't have a good solution to solve the non-uniformity problem and the phenomenon of crosstalk, thereby affecting the 3D image quality of the display device.

SUMMARY OF THE DISCLOSURE

One embodiment of the present disclosure discloses a stereoscopic display device capable of adjusting visual effects. The display device comprises a display module, an optical modulator, a storage element, and a controller. The display module comprises a plurality of pixels. The optical modulator is disposed on the display module and configured to modulate light emitted from the display module to corresponding directions. The optical modulator comprises a plurality of lenses each having a reference line. The storage element is configured to store a pixel offset map comprising pixel offsets between a center of each pixel of the plurality of pixels to a closest reference line of one of the plurality of lenses. The controller is coupled to the display module and the storage element, and configured to adjust data of the each pixel according to the pixel offset map.

Another embodiment of the present disclosure discloses a method for operating a stereoscopic display device for adjusting—visual effects. The display device comprises a display module, an optical modulator disposed on the display module, a pixel offset calculator, a storage element and a controller. The display module comprises a plurality of pixels, the optical modulator comprises a plurality of lenses, and each of the lenses has a reference line. The method comprises the pixel offset calculator calculating pixel offsets between a center of each pixel of the plurality of pixels to a closest reference line of the plurality of lenses, the storage element storing a pixel offset map comprising the pixel offsets between the center of the each pixel to the closest reference line, the controller adjusting data of the each pixel according to the pixel offset map, and the display module displaying adjusted data of the each pixel.

These and other objectives of the present disclosure will no doubt become obvious to those of ordinary skill in the art after reading the following detailed description of the embodiment that is illustrated in the various figures and drawings.

BRIEF DESCRIPTION OF THE DRAWINGS

FIG. 3 is an example of a pixel offset map shown in FIG. 1.

DETAILED DESCRIPTION

Figure 1:
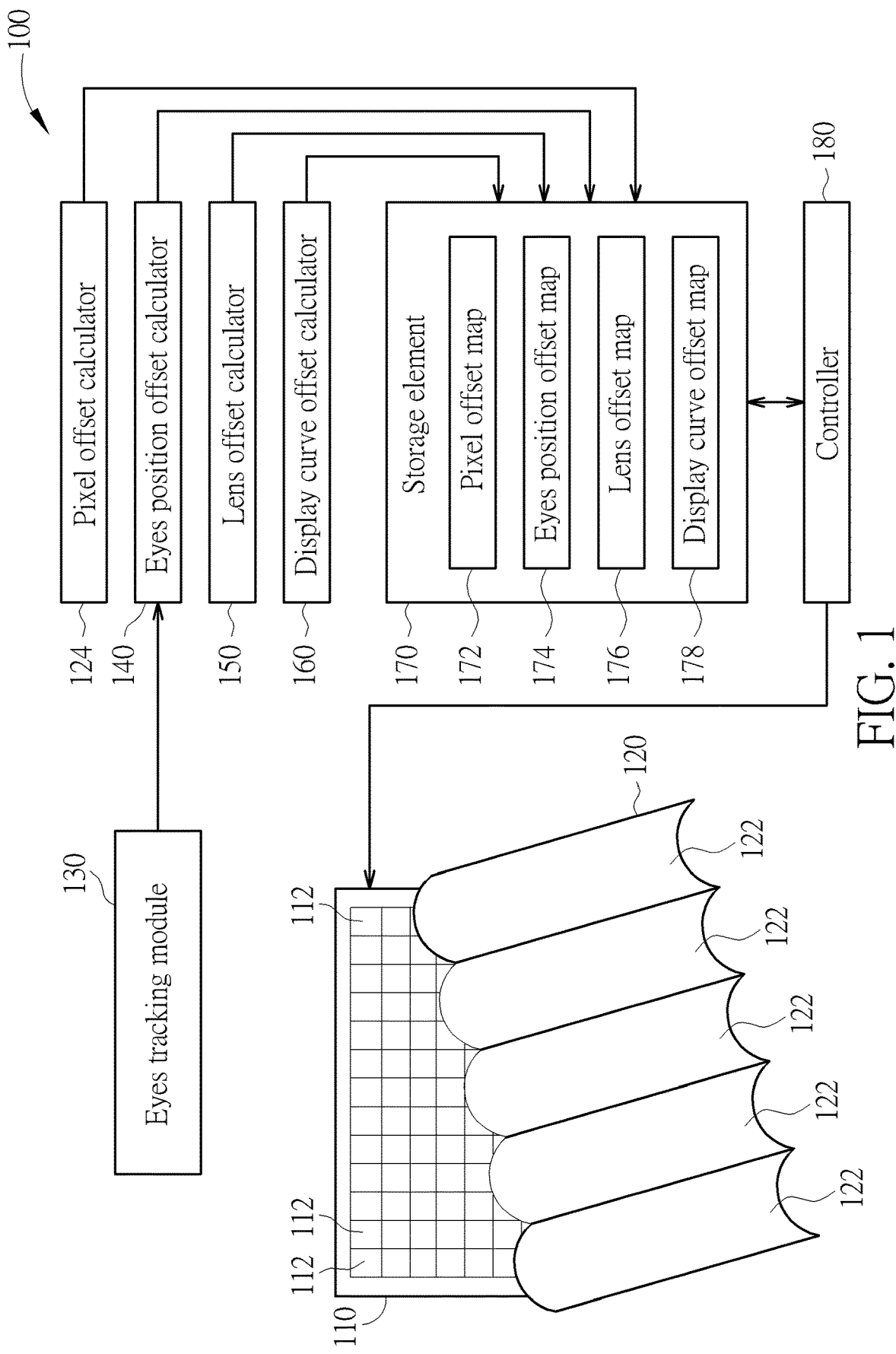
FIG. 1 shows a display device according to one embodiment of the present disclosure.

FIG. 1 shows a display device 100 according to one embodiment of the present disclosure. The display device 100 comprises a display module 110, an optical modulator 120, a storage element 170, and a controller 180. The controller 180 is coupled to the display module 110 and the storage element 170. In one embodiment, the storage element 170 could be a memory, a cloud database, or a hard disk drive, but it is not limited thereto.

In some embodiments, the display module 110 can be at least one of an organic light emitting diode (OLED) display module, a quantum light emitting diode (QLED) display module, a mini light emitting diode (mini-LED) display module, a micro light emitting diode (micro-LED) display module, or a liquid crystal display (LCD) module, but it is not limited thereto.

The optical modulator 120 can be disposed on the display module 110 so the optical modulator 120 can modulate the light emitted from the display module 110 to corresponding directions. The optical modulator 120 may comprise at least one of a lenticular film comprising a plurality of lenses, liquid crystal (LC) grin lenses, parallax barriers, or LC parallax barriers, but it is not limited thereto. In the embodiment, the optical modulator 120 comprises a plurality of lenses 122.

Figure 2:
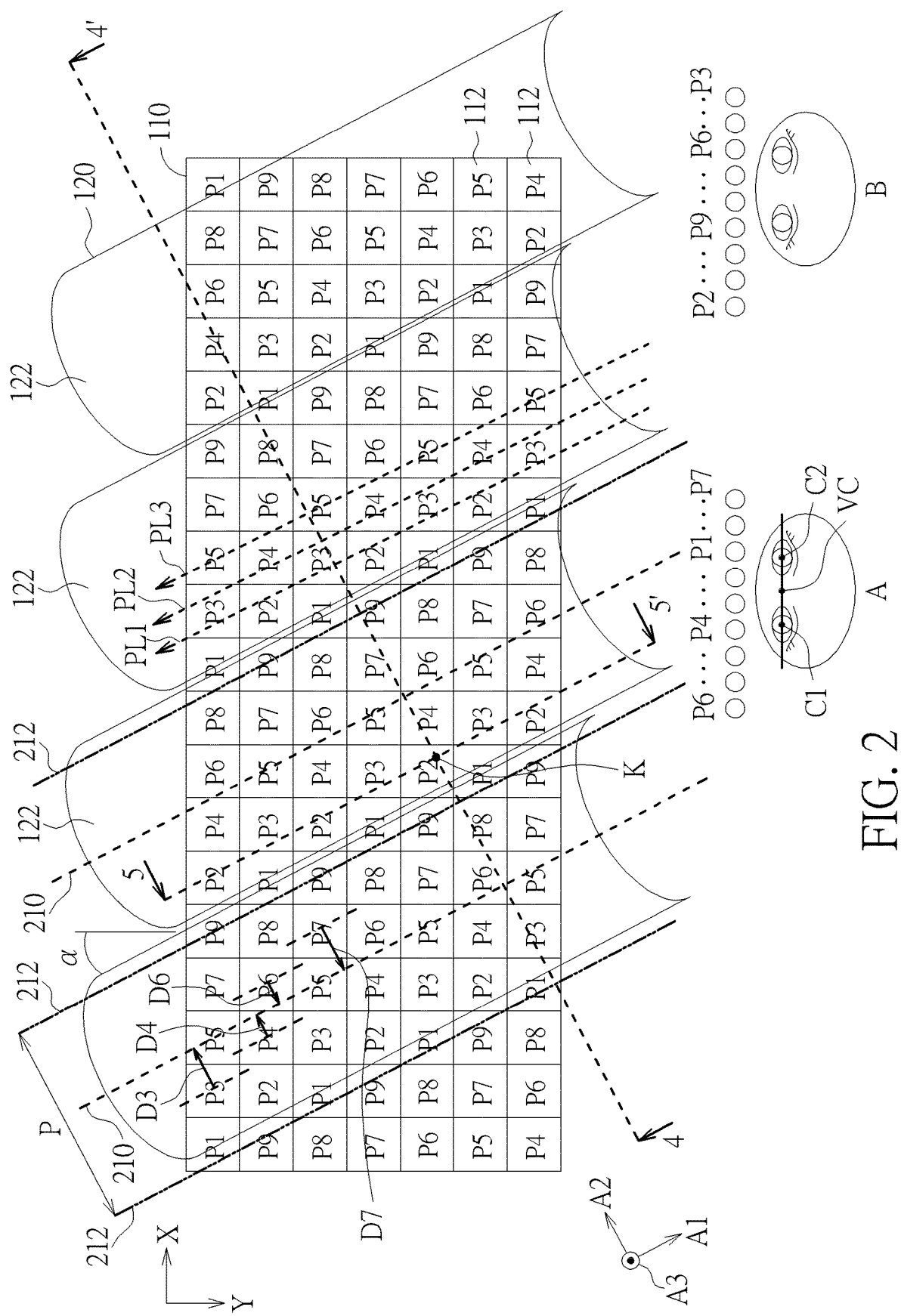
FIG. 2 shows the viewing pattern of the display module and the optical modulator according to one embodiment of the present disclosure.

FIG. 2 shows the viewing pattern of the display module 110 and the optical modulator 120 according to one embodiment of the present disclosure. In FIG. 2, the display module 110 comprises a plurality of pixels 112, and the pixels 112 can be divided into nine groups P1 to P9 for presenting images for nine different viewing angles. For example, the pixels 112 in group P1 are used to present the image for a first viewing angle, and the pixels 112 in group P2 are used to present the image for a second viewing angle, and so on. However, the present disclosure does not limit the display module 110 to providing nine different views. In some other embodiments of the present disclosure, the display module 110 may provide less or more views, and may have different pixel patterns according to the specification of the optical modulator 120 and the display module 110. In FIG. 2, different groups of pixels are arranged in parallel. For example, viewing lines PL1, PL2, and PL3 are in parallel and mainly formed by the pixels 112 in groups P3, P4 and P5 respectively. Therefore, as the viewer shifts her/his viewing position, the viewer may see the image presented by the pixels 112 in group P3, the image presented by the pixels 112 in group P4, and then the image presented by the pixels 112 in group P5. The lenses 122 of the optical modulator 120 modulate the light emitted from the pixels 112 to corresponding directions. Therefore, different images are presented by the pixels 112 in different groups P1 to P9.

Furthermore, in FIG. 2, the angle a between the optical modulator 120 and the display module 110 can be greater than zero degrees so that the images for different viewing angles can be diffused to reduce the sharp change between different views. That is, the angle a can be decided according to the system requirement, and may be 0 degrees in some embodiments.

The optical modulator 120 can direct the light emitted from the pixels to the corresponding directions. In the present embodiment, the order of the viewing directions modulated by the optical modulator 120 can be opposite to the order of the viewing lines arranged in the display module 110. For example, in the display module 110, the viewing lines formed by pixels in group P1 to pixels in group P9 are arranged from left to right; however, when moving from left to right, the viewer may actually see the image formed by pixels in group P9 to the image formed by pixels in group P1 sequentially due to the modulation caused by the optical modulator 120. Therefore, if the viewer watches the display module 110 from point A, the viewer may see the image provided by pixels in group P1 by her/his right eye, and may see the image provided by pixels in group P4 by her/his left eye. Similarly, if the viewer watches the display module 110 from the point B, the viewer may see the image provided by pixels in group P6 by her/his right eye, and may see the image provided by pixels in group P9 by her/his left eye.

Since the viewer's right eye and the left eye can receive images of different viewing angles, the 3D visual effect can be delivered by the display device 100. However, in prior art, the viewing angles provided by pixels 112 are predetermined and limited. Therefore, in a virtual case, the viewer may see the image provided by pixels in group P1 by her/his right eye and see the image provided by pixels in group P4 by her/his left eye, so the 3D visual effect can be delivered correctly. However, the fabrication and lamination process of the optical modulator 120 may have a critical non-uniformity problem of the 3D performance, which leads to increased cost of the optical modulator 120.

To solve the non-uniformity problem of the prior art, the display device 100 may comprise a pixel offset calculator 124 as shown in FIG. 1. The pixel offset calculator 124 is coupled to the storage element 170 and is configured to calculate a pixel offset between the center of each pixel 112 to a closest reference line of the lens 122. The reference line may be a virtual projected center line 210 or a virtual projected edge line 212 of a lens 122. Light emitted from the virtual projected center line 210 would pass through a virtual center line of the lens 122, and light emitted from the virtual projected edge line 212 would pass through a virtual edge line of the lens 122. As shown in FIG. 2 and please also refer to FIG. 1, a pixel 112 in group P3 has a pixel offset D3 between the center of the pixel 112 to a closest virtual projected center line 210, a pixel 112 in group P4 has a pixel offset D4 between the center of the pixel 112 to a closest virtual projected center line 210, a pixel 112 in group P6 has a pixel offset D6 between the center of the pixel 112 to a closest virtual projected center line 210, and a pixel 112 in group P7 has a pixel offset D7 between the center of the pixel 112 to a closest virtual projected center line 210. The pixel offset calculator 124 calculates the pixel offsets of the pixels 112 and records the pixel offsets into a pixel offset map 172 stored in the storage element 170. FIG. 3 is an example of the pixel offset map 172. An index X of the pixel offset map 172 represents a horizontal coordinate of the pixels 112, and an index Y of the pixel offset map 172 represents a vertical coordinate of the pixels 112. A unit of the pixel offsets recorded in the pixel offset map 172 is a lenticular pitch P between two adjacent virtual projected edge lines 212. For example, the pixel offset of the pixel 112 at coordinates (X, Y)=(1, 1) is −0.055P. The negative pixel offsets and positive pixel offsets respectively represent pixels 112 located at different sides of the reference line. For example, the pixels 112 in groups P2, P3, P4 and P5 at one side of the virtual projected center line 210 have negative pixel offsets, and the pixels 112 in groups P6, P7, P8 and P9 at the other side of the virtual projected center line 210 have positive pixel offsets.

After the pixel offsets of all pixels 112 are calculated by the pixel offset calculator 124, the controller 180 would adjust the original image data of each pixel 112 according to the pixel offset map 172, and the pixels 112 are driven according to the adjusted data. Therefore, the pixel offsets would be compensated, and the viewer would see a 3D image displayed on the display device 100 with any kind of pixel and lens arrangements without crosstalk and moiré. For example, the RGB delta pixel arrangement or 2 dimensional micro lens array (MLA) can be applied too. Also, the pixel offsets are used for unlimited view points of the light field display and the viewer would see a natural 3D image.

To further improve the 3D visual effects and allow the viewer to watch the display device 100 casually without concerning about the limited viewing positions, the display device 100 can use an eyes tracking module 130 to track the positions of the viewer's eyes and use an eyes position offset calculator 140 to calculate eyes position offset for each pixel 112.

Figure 4:
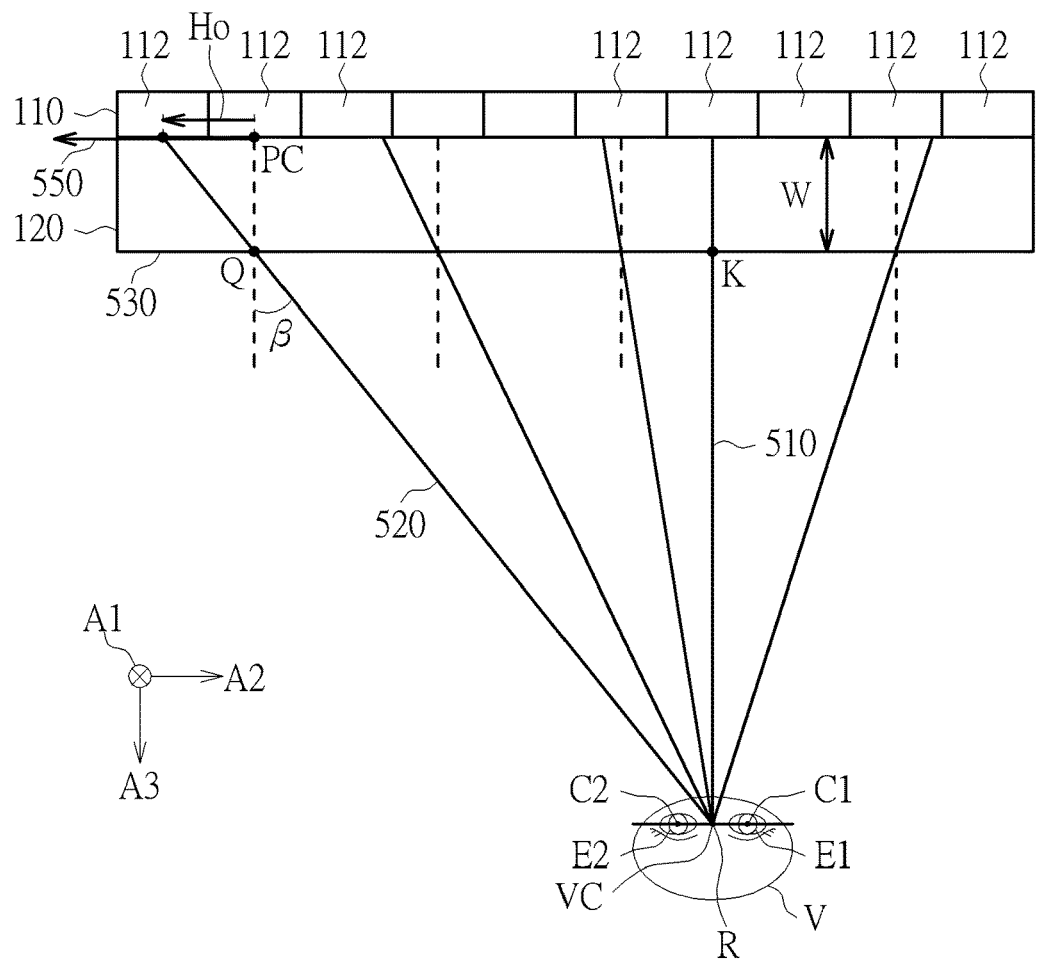
FIG. 4 is a cross-sectional view of the display module and the optical modulator along a dotted line 4-4' shown in FIG. 2.
Figure 5:
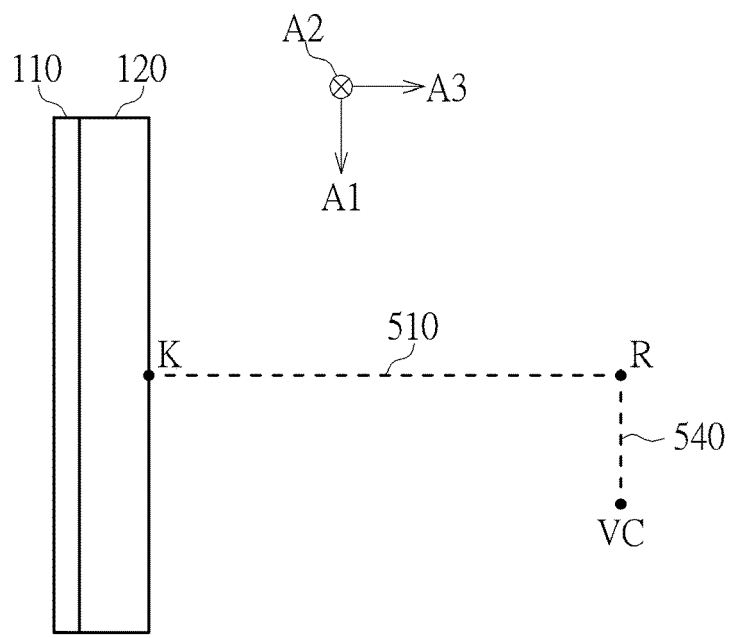
FIG. 5 is a cross-sectional view of the display module and the optical modulator along a dotted line 5-5' shown in FIG. 2.

FIG. 4 is a cross-sectional view of the display module 110 and the optical modulator 120 along a dotted line 4-4' shown in FIG. 2. FIG. 5 is a cross-sectional view of the display module 110 and the optical modulator 120 along a dotted line 5-5' shown in FIG. 2. The dotted line 5-5' is parallel to a first axis A1, the dotted line 4-4' is parallel to a second axis A2, and the first axis A1, the second axis A2 and a third axis A3 are perpendicular to each other. The eyes tracking module 130 is configured to track positions of centers C1 and C2 of the eyes E1 and E2 of a viewer V. The eyes position offset calculator 140 is coupled to the eyes tracking module 130 and the storage element 170 and configured to calculate an angle β between a slant line 520 and a normal line 510 of the display module 110. The slant line 520 passes through a first point Q on an upper surface 530 of the optical modulator 120 and disposed above the center PC of a pixel 112. As shown in FIG. 5, the normal line 510 passes through a second point R, which is projected from a center VC of the centers C1 and C2 of the viewer's eyes E1 and E2 along a line 540 parallel to the first axis A1 and the virtual projected center line 210. The normal line 510 also passes through a point K on the upper surface 530 of the optical modulator 120, and is parallel to the third axis A3 and perpendicular to a base line 550. The base line 550 is parallel to the second axis A2, is perpendicular to the first axis A1 and the virtual projected center line 210, and passes through the center PC of the pixel 112. The eyes position offset calculator 140 calculates eyes position offset Ho according to the angle β and a distance W between the first point Q and the center PC of the pixel 112. The eyes position offset Ho is a product of the distance W and tangent of the angle β. The storage element 170 is further configured to store an eyes position offset map 174, which comprises eyes position offsets of the pixels 112. The controller 180 is configured to adjust the data of each pixel 112 according to the pixel offset map 172 and the eyes position offset map 174, and the pixels 112 are driven according to the adjusted data. Therefore, the eyes position offsets would be compensated.

Figure 6:
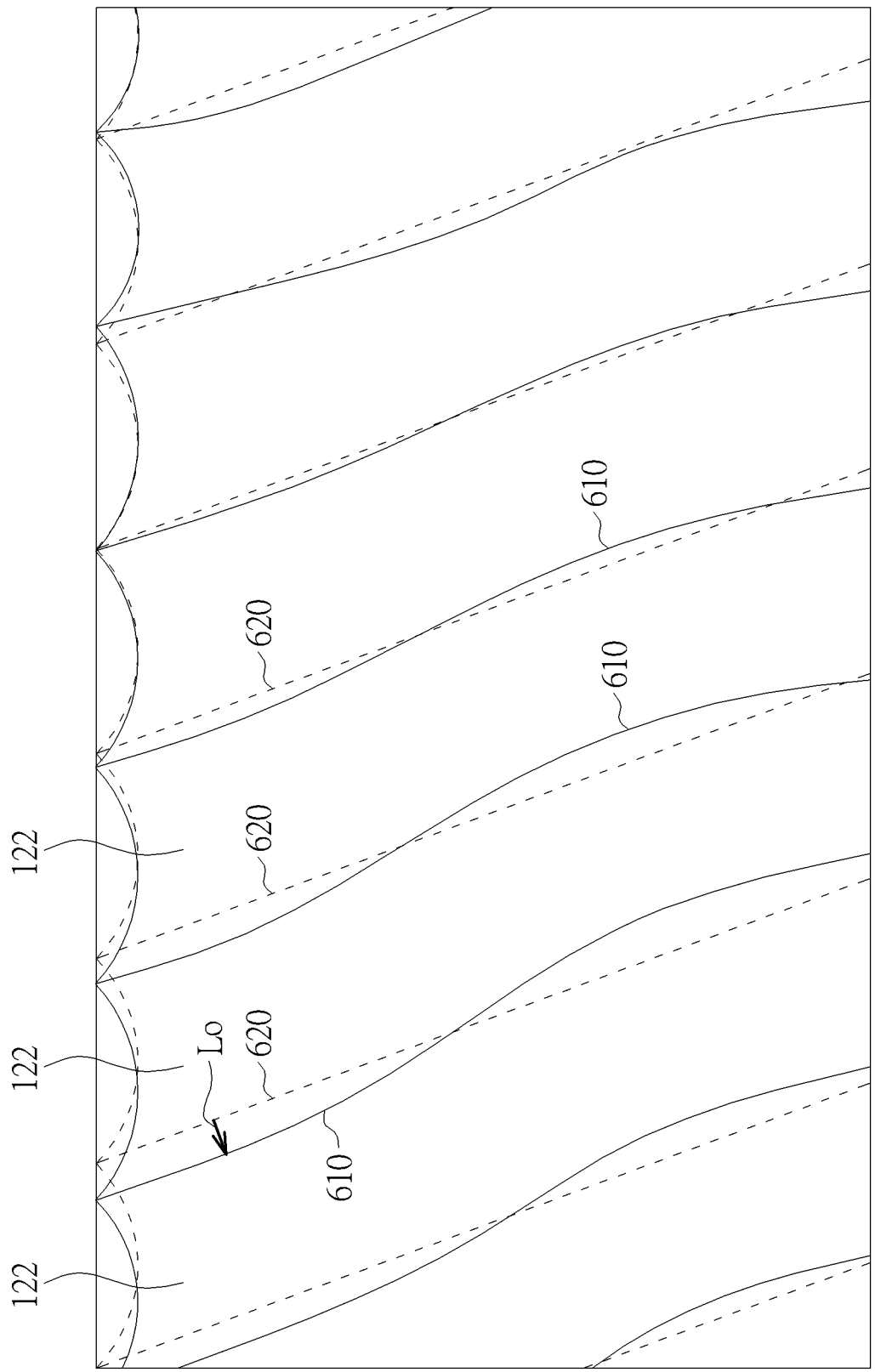
FIG. 6 shows actual lens positions and virtual lens positions of the lenses.

In another embodiment of the disclosure, the display device 100 further comprises a lens offset calculator 150. FIG. 6 shows actual lens positions 610 and virtual lens positions 620 of the lenses 122. The lens offset calculator 150 is coupled to the storage element 170 and configured to generate lens offsets Lo between the actual lens positions and virtual lens positions on the pixels 112. The storage element 170 is further configured to store a lens offset map 176 comprising the lens offsets of the pixels 112. The controller 180 is configured to adjust the data of each pixel 112 according to the pixel offset map 172, the eyes position offset map 174 and the lens offset map 176. In another embodiment, the controller 180 is configured to adjust the data of each pixel 112 according to the pixel offset map 172 and the lens offset map 176.

Figure 7:
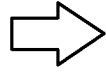
FIG. 7 shows examples of a lens offset map and an extended lens offset map.

In an embodiment of the disclosure, the lens offset calculator 150 measures the lens offsets of a few pixels of the plurality of pixels 112, then generates the lens offsets of remaining pixels of the plurality of pixels 112 by interpolation or extrapolation. FIG. 7 shows examples of the lens offset map 176 and an extended lens offset map 776. In the embodiment, the lens offset calculator 150 measures the lens offsets of twenty-five pixels 112, then generates the lens offsets of remaining pixels of the plurality of pixels 112 by interpolation or extrapolation to generate the extended lens offset map 776, which may comprise the lens offsets of all pixels 112 of the display module 110. The controller 180 may adjust the data of each pixel 112 according to the pixel offset map 172 and the extended lens offset map 776.

Figure 8:
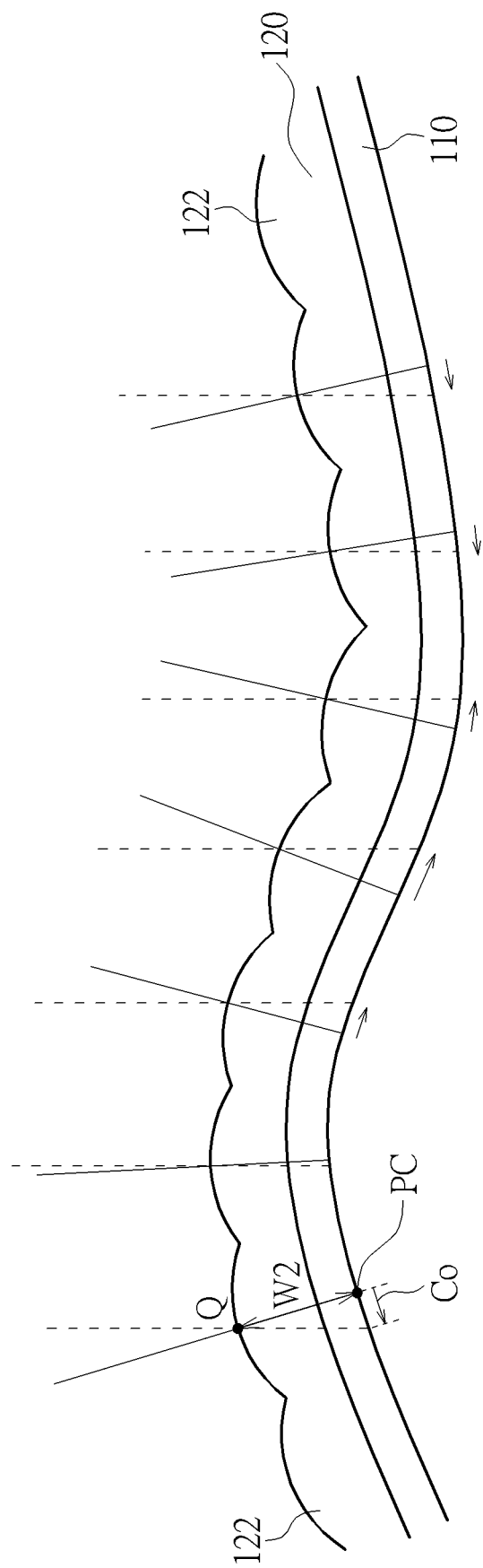
FIG. 8 is a cross-sectional view of the display module and the optical modulator when the display module and the optical modulator are curved.

In another embodiment of the disclosure, the display device 100 further comprises a display curve offset calculator 160. FIG. 8 is a cross-sectional view of the display module 110 and the optical modulator 120 when the display module 110 and the optical modulator 120 are curved. The display curve offset calculator 160 coupled to the storage element 170 and configured to generate display curve offsets Co of the pixels 112 according to curvatures of the pixels 112 and a distance W2 between the center PC of the pixel 112 and the point Q on the upper surface 530 of the optical modulator 120 corresponding to the center PC of the pixel 112. The storage element 170 is further configured to store a display curve offset map 178 comprising display curve offsets Co of the pixels 112. The controller 180 is configured to adjust the data of each pixel 112 according to the pixel offset map 172, the eyes position offset map 174, the lens offset map 176 and the display curve offset map 178. In another embodiment, the controller is configured to adjust the data of each pixel 112 according to the pixel offset map 172 and the display curve offset map 178.

Figure 9:
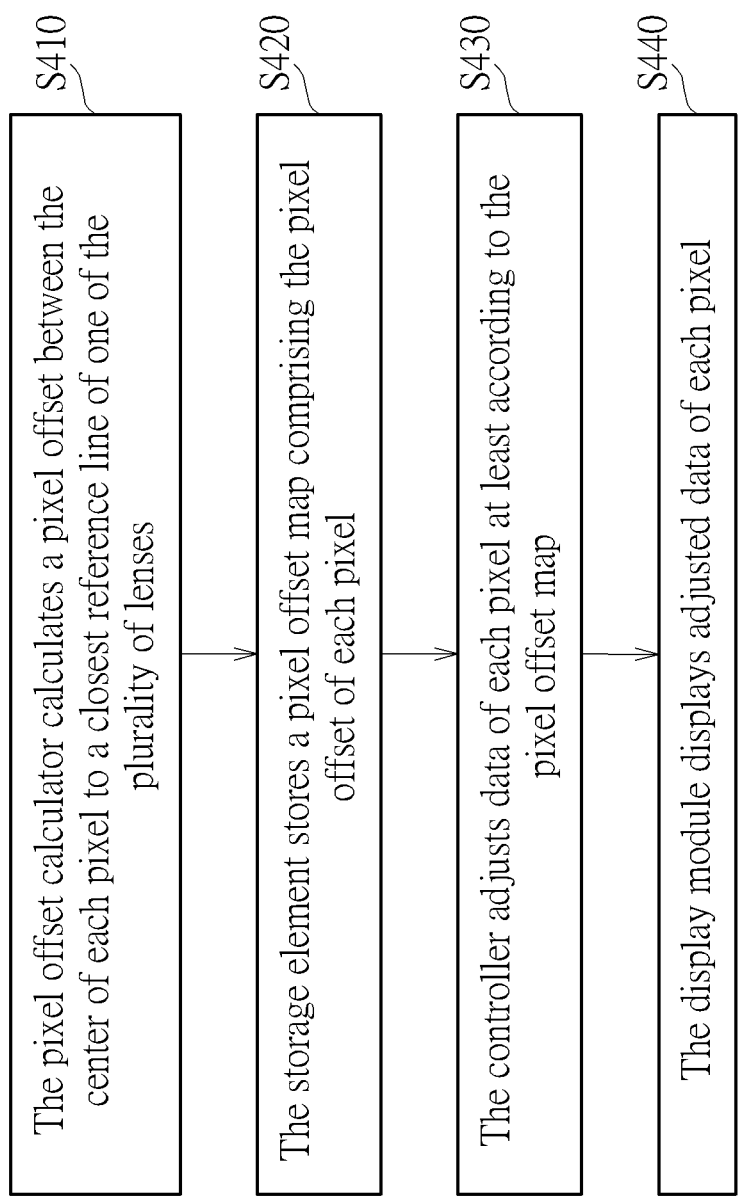
FIG. 9 to FIG. 12 respectively show a flow chart of a method for operating the display device according different embodiments of the present disclosure.

FIG. 9 shows a flow chart of a method for operating the display device 100 according one embodiment of the present disclosure. The method includes steps S410 to S440.

Step S410: calculating, by the pixel offset calculator 124, the pixel offset (e.g., the pixel offsets D3, D4, D6 and D7 in FIG. 2) between the center of each pixel 112 to a closest reference line of one of the plurality of lenses (e.g., a virtual projected center line 210 or a virtual projected edge line 212 in FIG. 2);

Step S420: storing, by the storage element 170, the pixel offset map 172 which comprises the pixel offset of each pixel 112;

Step S430: adjusting, by the controller 180, data of each pixel 112 according to the pixel offset map 172; and Step S440: displaying, by the display module 110, the adjusted data of each pixel 112.

Figure 10:
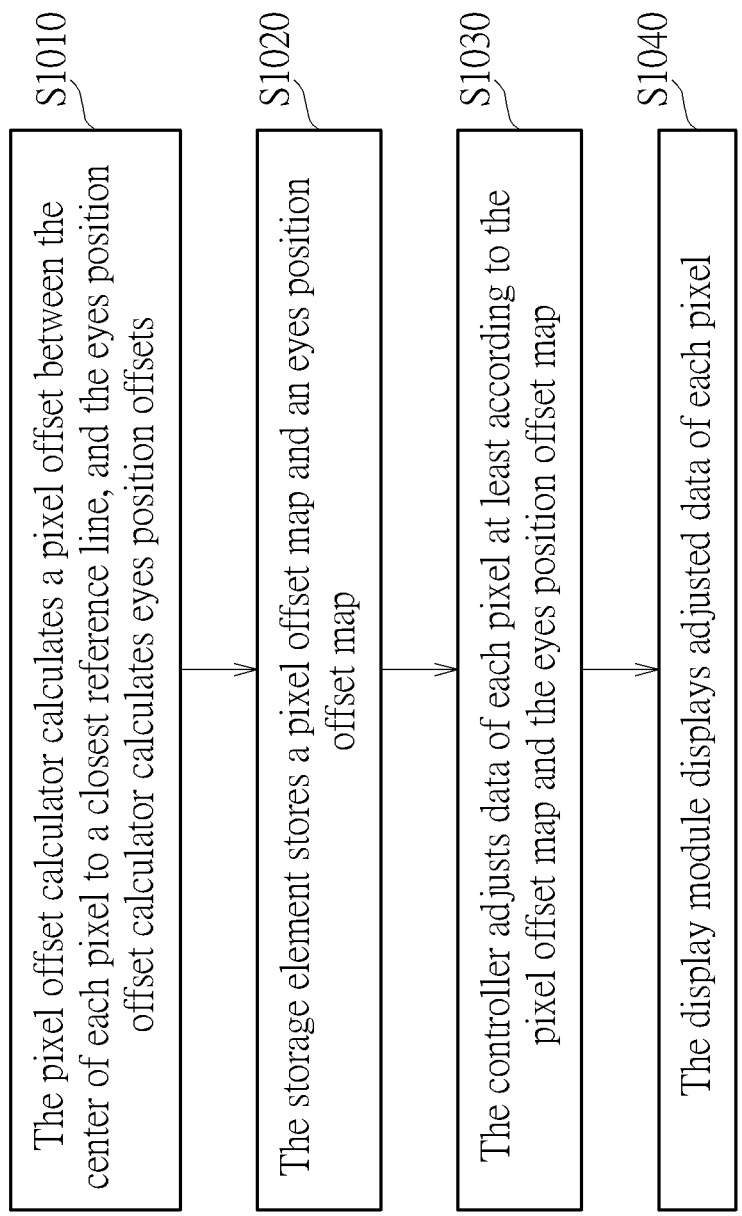

FIG. 10 shows a flow chart of a method for operating the display device 100 according another embodiment of the present disclosure. The method includes steps S1010 to S1040.

Step S1010: calculating, by the pixel offset calculator 124, the pixel offsets (e.g., the pixel offsets D3, D4, D6 and D7 in FIG. 2), and calculating, by the eyes position offset calculator 140, the eyes position offsets (e.g., the eyes position offset Ho in FIG. 5);

Step S1020: storing, by the storage element 170, the pixel offset map 172 and the eyes position offset map 174;

Step S1030: adjusting, by the controller 180, data of each pixel 112 according to the pixel offset map 172 and the eyes position offset map 174; and Step S1040: displaying, by the display module 110, the adjusted data of each pixel 112.

Figure 11:
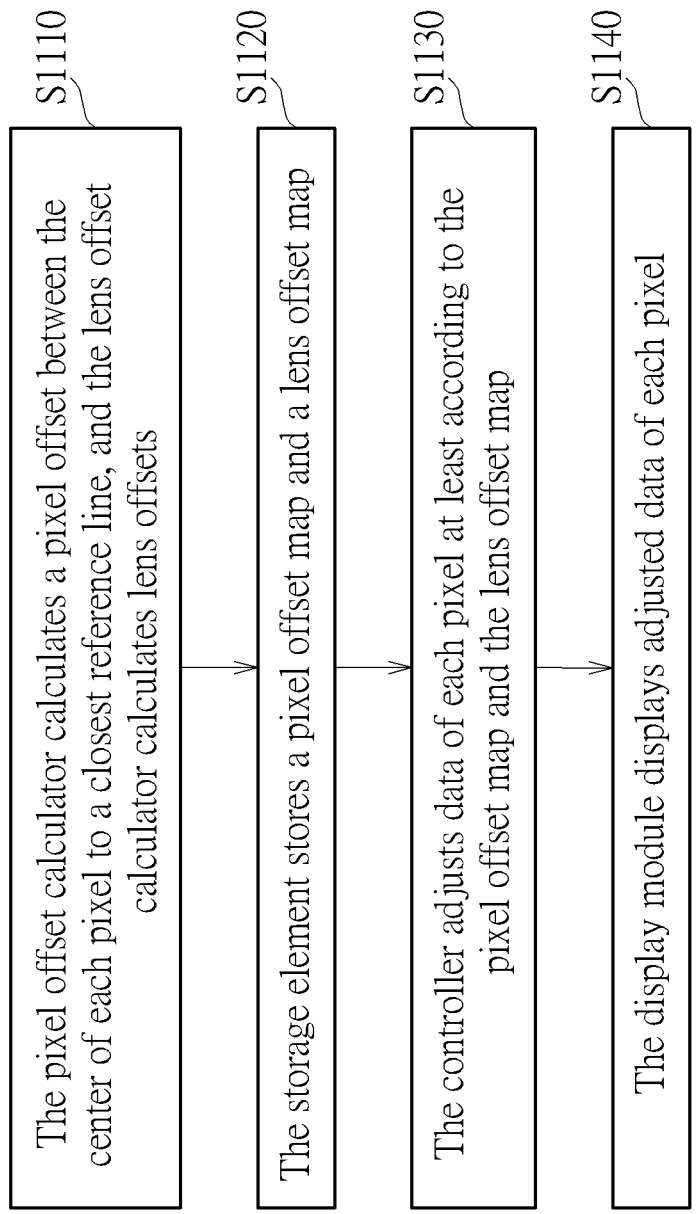

FIG. 11 shows a flow chart of a method for operating the display device 100 according another embodiment of the present disclosure. The method includes steps S1110 to S1140.

Step S1110: calculating, by the pixel offset calculator 124, the pixel offsets (e.g., the pixel offsets D3, D4, D6 and D7 in FIG. 2), and calculating, by the lens offset calculator 150, the lens offsets (e.g., the lens offset Lo in FIG. 6);

Step S1120: storing, by the storage element 170, the pixel offset map 172 and the lens offset map 176;

Step S1130: adjusting, by the controller 180, data of each pixel 112 according to the pixel offset map 172 and the lens offset map 176; and Step S1140: displaying, by the display module 110, the adjusted data of each pixel 112.

Figure 12:
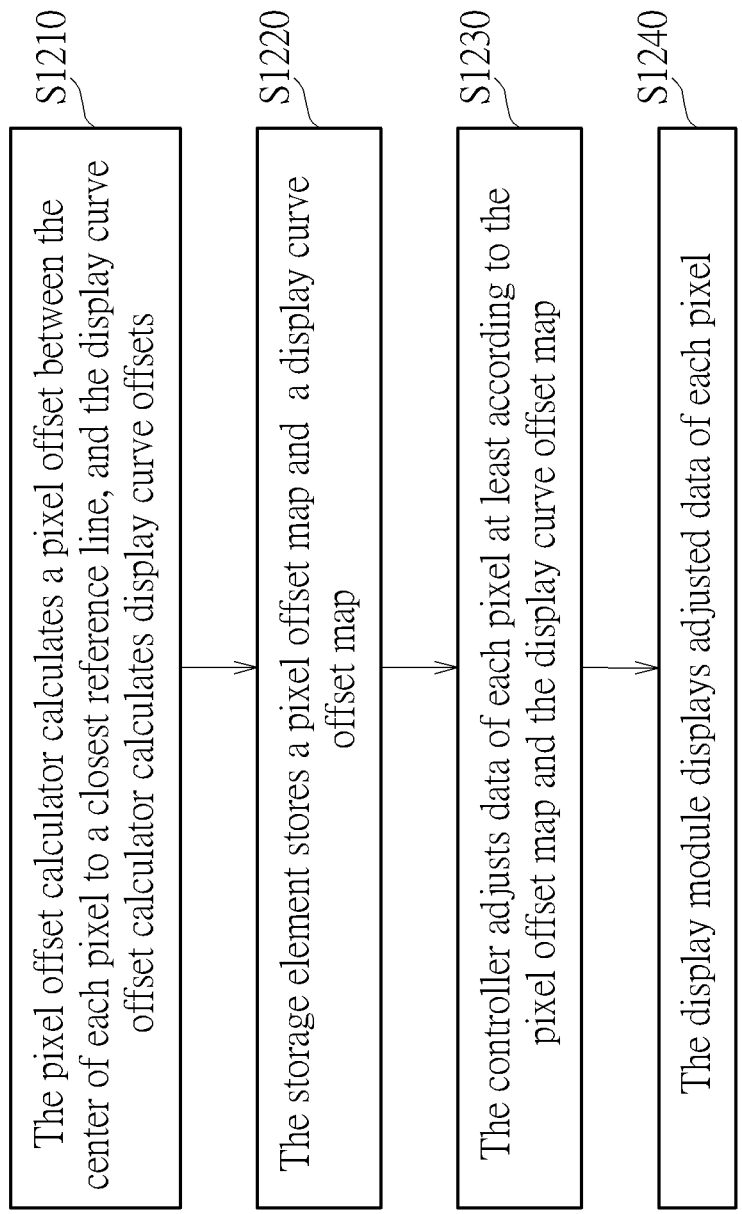

FIG. 12 shows a flow chart of a method for operating the display device 100 according another embodiment of the present disclosure. The method includes steps S1210 to S1240.

Step S1210: calculating, by the pixel offset calculator 124, the pixel offsets (e.g., the pixel offsets D3, D4, D6 and D7 in FIG. 2), and calculating, by the display curve offset calculator 160, the display curve offsets (e.g., the display curve offset Co in FIG. 8);

Step S1220: storing, by the storage element 170, the pixel offset map 172 and the display curve offset map 178;

Step S1230: adjusting, by the controller 180, data of each pixel 112 according to the pixel offset map 172 and the display curve offset map 178; and Step S1240: displaying, by the display module 110, the adjusted data of each pixel 112.

In summary, the display device and the method for operating the display device can compensate the pixel offsets such that the viewer would see a 3D image displayed on the display device without crosstalk. The display device may also compensate the eyes position offsets, the lens offsets and/or the display curve offsets to further improve the 3D visual effects of the display device.

Also, to determine whether the present disclosed display device has been infringed, the pixel offsets, the eyes position offsets, the lens offsets and/or the display curve offsets of the pixels of the display device could be measured. When the display device operates without 3D rendering, first pixel offsets, first eyes position offsets, first lens offsets and/or first display curve offsets of the pixels would be measured. When the display device operates with 3D rendering, second pixel offsets, second eyes position offsets, second lens offsets and/or second display curve offsets of the pixels would be measured. The pixel offset map could be obtained by comparing the first pixel offsets and the second pixel offsets, the eyes position offset map could be obtained by comparing the first eyes position offsets and the second eyes position offsets, the lens offset map could be obtained by comparing the first lens offsets and the second lens offsets, and/or the display curve offset map could be obtained by comparing the first display curve offsets and the second display curve offsets. Therefore, the pixel offset, the eyes position offset, the lens offset and/or the display curve offset of each pixel could be calculated and analyzed. In addition, two or more display devices could be measured. If the display devices use the method of the disclosure, the pixel offset maps of the display devices would be different, the eyes position offset maps of the display devices would be different, the lens offset maps of the display devices would be different, and/or the display curve offset maps of the display devices would be different due to variations of fabrication of the display devices.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A stereoscopic display device, comprising:
a display module comprising a plurality of pixels;
an optical modulator disposed on the display module and configured to modulate light emitted from the display module to corresponding directions, the optical modulator comprising a plurality of lenses each having a reference line;
a storage element configured to store a pixel offset map comprising pixel offsets between a center of each pixel of the plurality of pixels to a closest reference line of the plurality of lenses; and
a controller coupled to the display module and the storage element, and configured to adjust data of the each pixel according to the pixel offset map.

2. The display device of claim 1, further comprising a pixel offset calculator coupled to the storage element and configured to calculate the pixel offset between the center of the each pixel to the closest reference line.

3. The display device of claim 1, wherein the reference line is a virtual projected center line or a virtual projected edge line of one of the plurality of lenses.

4. The display device of claim 1, further comprising:
an eyes tracking module configured to track positions of centers of a viewer's eyes;
an eyes position offset calculator coupled to the eyes tracking module and the storage element and configured to:
calculate an angle between a slant line and a normal line of the display module, the slant line passing through a first point on an upper surface of the optical modulator and disposed above the center of a pixel, the normal line being perpendicular to a base line and passing through the center of the pixel, wherein the base line is perpendicular to the reference line; and
calculate an eyes position offset according to the angle and a distance between the first point and the center of the pixel;
wherein the storage element is further configured to store an eyes position offset map comprising the eyes position offsets of the each pixel, and the controller is configured to adjust the data of the each pixel further according to the eyes position offset map.

5. The display device of claim 4, wherein the eyes position offset is a product of the distance between the first point and the center of the pixel and tangent of the angle.

6. The display device of claim 1, further comprising:
a lens offset calculator coupled to the storage element and configured to generate a lens offset between an actual lens position and a virtual lens position on one of the plurality of pixels;
wherein the storage element is further configured to store a lens offset map comprising the lens offsets of the each pixel, and the controller is configured to adjust the data of the each pixel further according to the lens offset map.

7. The display device of claim 6, wherein the lens offset calculator measures lens offsets of a few pixels of the plurality of pixels, then generates lens offsets of remaining pixels of the plurality of pixels by interpolation or extrapolation.

8. The display device of claim 1, further comprising:
a display curve offset calculator coupled to the storage element and configured to generate a display curve offset of one pixel of the plurality of pixels according to a curvature of the one pixel and a distance between the center of the one pixel and a point on the upper surface of the optical modulator corresponding to the center of the one pixel;
wherein the storage element is further configured to store a display curve offset map comprising the display curve offsets of the each pixel, and the controller is configured to adjust the data of the each pixel further according to the display curve offset map.

9. A method for operating a stereoscopic display device for adjusting visual effects, the display device comprising a display module, an optical modulator disposed on the display module, a pixel offset calculator, a storage element and a controller, the display module comprising a plurality of pixels, the optical modulator comprising a plurality of lenses each having a reference line, the method comprising:
calculating, by the pixel offset calculator, pixel offsets between a center of each pixel of the plurality of pixels to a closest reference line of the plurality of lenses;
storing, by the storage element, a pixel offset map comprising the pixel offsets between the center of the each pixel to the closest reference line;
adjusting, by the controller, data of the each pixel according to the pixel offset map; and
displaying, by the display module, adjusted data of the each pixel.

10. The method of claim 9, wherein the reference line is a virtual projected center line or a virtual projected edge line of one of the plurality of lenses.

11. The method of claim 9, wherein:
the display device further comprises an eyes tracking module and an eyes position offset calculator coupled to the eyes tracking module and the storage element;
the method further comprises:
tracking, by the eyes tracking module, positions of centers of a viewer's eyes;
calculating, by the eyes position offset calculator, an angle between a slant line and a normal line of the display module, the slant line passing through a first point on an upper surface of the optical modulator and disposed above the center of a pixel, the normal line being perpendicular to a base line and passing through the center of the pixel, wherein the base line is perpendicular to the reference line;
calculating, by the eyes position offset calculator, an eyes position offset according to the angle and a distance between the first point and the center of the pixel; and
storing, by the storage element, an eyes position offset map comprising eyes position offsets of the pixels; and
adjusting, by the controller, the data of the each pixel further according to the eyes position offset map.

12. The method of claim 11, wherein the eyes position offset calculator calculates the eyes position offset by multiplying the distance between the first point and the center of the pixel by tangent of the angle.

13. The method of claim 9, wherein:
the display device further comprises a lens offset calculator coupled to the storage element;
the method further comprises:
generating a lens offset between an actual lens position and a virtual lens position on one of the plurality of pixels; and
storing, by the storage element, a lens offset map comprising the lens offsets of the each pixel; and
adjusting, by the controller, the data of the each pixel further according to and the lens offset map.

14. The method of claim 13, wherein the lens offset calculator measures lens offsets of a few pixels of the plurality of pixels, then generates lens offsets of remaining pixels of the plurality of pixels by interpolation or extrapolation.

15. The method of claim 9, wherein:
the display device further comprises a display curve offset calculator coupled to the storage element;
the method further comprises:
generating a display curve offset of one pixel of the plurality of pixels according to a curvature of the one pixel and a distance between the center of the one pixel and a point on the upper surface of the optical modulator corresponding to the center of the one pixel; and
storing, by the storage element, a display curve offset map comprising display curve offsets of the each pixel; and
adjusting, by the controller, the data of the each pixel further according to the display curve offset map.

* * * * *